United States Patent
Kang et al.

(10) Patent No.: US 10,595,227 B2
(45) Date of Patent: Mar. 17, 2020

(54) APPARATUS FOR SIMULTANEOUSLY MULTIPLEXING AND TRANSMITTING BROADBAND TRAFFIC AND MACHINE-TO-MACHINE COMMUNICATION TRAFFIC OR ULTRA-LOW-DELAY COMMUNICATION TRAFFIC USING SAME RESOURCE AND METHOD THEREFOR

(71) Applicant: KOREA UNIVERSITY RESEARCH AND BUSINESS FOUNDATION, Seoul (KR)

(72) Inventors: Chung Gu Kang, Seoul (KR); Ameha Tsegaye Abebe, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 16/092,968

(22) PCT Filed: Apr. 12, 2017

(86) PCT No.: PCT/KR2017/003977
§ 371 (c)(1),
(2) Date: May 1, 2019

(87) PCT Pub. No.: WO2017/179915
PCT Pub. Date: Oct. 19, 2017

(65) Prior Publication Data
US 2019/0253923 A1    Aug. 15, 2019

(30) Foreign Application Priority Data

Apr. 12, 2016 (KR) .................. 10-2016-0045124
Apr. 11, 2017 (KR) .................. 10-2017-0046940

(51) Int. Cl.
*H04W 28/06* (2009.01)
*H04W 28/02* (2009.01)
(Continued)

(52) U.S. Cl.
CPC .............. *H04W 28/06* (2013.01); *H04L 5/00* (2013.01); *H04W 4/70* (2018.02);
(Continued)

(58) Field of Classification Search
CPC ...... H04L 5/0007; H04L 27/206; H04J 11/00; H04W 72/0446; H04W 88/08;
(Continued)

(56) References Cited

U.S. PATENT DOCUMENTS

2015/0181603 A1    6/2015   Wakabayashi
2017/0289265 A1*  10/2017   Faccin ................. H04W 48/17
(Continued)

FOREIGN PATENT DOCUMENTS

JP    2003-046474 A    2/2003
KR    10-1229690 B1    2/2013

OTHER PUBLICATIONS

Overview of mMTC and URLLC for NR access technology, NTT DOCOMO, Inc, Apr. 11-15, 2016, pp. 1-3, Busan, Korea.
(Continued)

*Primary Examiner* — Brenda H Pham
(74) *Attorney, Agent, or Firm* — Hauptman Ham, LLP (57) ABSTRACT

Disclosed are an apparatus and a method for simultaneously multiplexing and transmitting a broadband traffic and a machine-to-machine traffic or an ultra-reliable low latency communication traffic using the same resource. That is, according to the present invention, it is possible to enhance efficiency of resources when an eMBB traffic and an mMTC traffic or an uRLLC traffic are multiplexed, by spreading and transmitting intermittent data generated in an MTC terminal
(Continued)

with superimposition on a subcarrier resource allocated to an eMBB terminal without reservation on a time axis while sharing a high-speed data resource in an OFDMA system and transmitting an uRLCC terminal requiring a short transmission latency time with superimposition on one symbol on a frequency axis.

11 Claims, 7 Drawing Sheets

(51) Int. Cl.
    *H04W 4/70* (2018.01)
    *H04W 56/00* (2009.01)
    *H04W 72/04* (2009.01)
    *H04L 5/00* (2006.01)
    *H04W 72/02* (2009.01)

(52) U.S. Cl.
    CPC ..... *H04W 28/0236* (2013.01); *H04W 56/001* (2013.01); *H04W 72/0446* (2013.01); *H04W 72/0453* (2013.01); *H04L 5/0007* (2013.01); *H04W 72/02* (2013.01)

(58) Field of Classification Search
    CPC . H04W 72/0453; H04W 74/04; H04W 72/04; H04W 76/00; H04W 84/12; H04W 74/0816; H04W 72/0406; H04B 7/2643; H04B 7/2656

USPC .............. 370/208, 203, 330, 347, 348, 329
    See application file for complete search history.

(56)  References Cited

U.S. PATENT DOCUMENTS

2018/0014218 A1*  1/2018  Kubota ................ H04W 24/10
    2018/0091345 A1*  3/2018  Lee ...................... H04J 11/00
    2019/0116007 A1*  4/2019  Yi ......................... H04W 4/42

OTHER PUBLICATIONS

3rd Generation Partnership Project; Technical Specification Group Radio Access Network; Study on Scenarios and Requirements for Next Generation Access Technologies, 3GPP TR 38.913, Mar. 2016, pp. 1-30, France.
Design considerations on URRLLC for New Radio systems, InterDigital Communications, Apr. 11-15, 2016, pp. 1-5, Busan, Korea.
Overview of 5G frame structure, Hwawei, HiSilicon, Apr. 11-15, 2016, pp. 1-6, Busan, Korea.
Considerations for eMBB in the new RAT, ETI, Apr. 11-15, 2016, pp. 1-3, Busan, Korea.
Korean Office Action dated May 9, 2018, in connection with the Korean Patent Application No. 10-2017-0046940.
International Search Report dated Aug. 10, 2017, corresponding to International Application No. PCT/KR2017/003977.

* cited by examiner

Input : $A = A_m, \{y_i\}_{j=1}^{N_c}, I_{max}$
Iteration : $W^{(0)} = I, I = 0$
   Intialization : $G^{(0)} = \emptyset, r_j^{(0)} = y^{(j)}, \ell = 0$
   Sub − Iterarion : $\ell \rightarrow \ell + 1$
      $k_{max} \leftarrow \arg\max_{k \in \bar{G}^{(\ell-1)}} |W_{kk}^{(I)} A_k^H r_j^{(\ell-1)}|$ and $G^{(\ell)} = k_{max} \cup G^{(\ell-1)}$
      Solve $\hat{x}_{\Gamma(G^{(\ell)})}^{(\ell)}$ by using (5) and $\hat{x}_{\Gamma(\bar{G}^{(\ell)})}^{(\ell)} = 0$
      $r_j^{(\ell)} = y^{(j)} - A\hat{x}_j^{(\ell)}$
      If $\ell = K_a$ or $\|r_i^{(\ell)}\|_2 < \|r_{th}\|_2$, stop
      Otherwise, start new sub-iteration
   Output : $\{\hat{x}_m^{(j)}\}_{j=1}^{N_c}$
Update : $W^{(I)}$ with (5)
if $I = I_{max}$, stop.
otherwise, $I \rightarrow I + 1$ and begin new iteration
Output : $\{\hat{x}_m^{(j)}\}_{j=1}^{N_c}$

APPARATUS FOR SIMULTANEOUSLY MULTIPLEXING AND TRANSMITTING BROADBAND TRAFFIC AND MACHINE-TO-MACHINE COMMUNICATION TRAFFIC OR ULTRA-LOW-DELAY COMMUNICATION TRAFFIC USING SAME RESOURCE AND METHOD THEREFOR

CROSS-REFERENCE TO RELATED APPLICATIONS

This application claims the priority of Korean Patent Application Nos. 10-2016-0045124 filed on Apr. 12, 2016 and 10-2017-0046940 filed on Apr. 11, 2017, in the Korean Patent and Trademark Office. Further, this application is the National Phase application of International Application No. PCT/KR2017/003977 filed on Apr. 12, 2017, which is incorporated herein by reference in its entirety.

BACKGROUND OF THE INVENTION

Field of the Invention

The present invention relates to an apparatus for simultaneously multiplexing and transmitting a broadband traffic and a machine-to-machine traffic or an ultra-reliable low latency communication traffic using the same resource, and a method thereof, and more particularly, to an apparatus for simultaneously multiplexing and transmitting a broadband traffic and a machine-to-machine traffic or an ultra-reliable low latency communication traffic using the same resource, and a method thereof in which intermittent data generated in a machine-type communication (MTC) terminal is transmitted with superimposition on a subcarrier allocated to an enhanced mobile broadband (eMBB) terminal without reservation by sharing a high-speed data transmission resource in an OFDMA system.

Description of the Related Art

A standard for supporting Internet of Things (IoT) devices using a coverage characteristic with high reliability in a mobile communication system is emerging, and a representative example is a narrowband-internet of things (NB-IoT) standard of a 3rd generation partnership project (3GPP).

With the aim of commercialization in 2019, a 5G mobile communication standard, which is currently under standardization, aims to support 1 million machine-type communication (MTC) devices per 1 $km^2$, and a wireless access standard required for such massive MTC (mMTC) needs to be designed.

In general, the MTC intermittently transmits a packet having a short length, and accordingly, a random access procedure performed in the uplink needs to be simplified.

However, in the case of a current long term evolution (LTE), even when a short packet is to be transmitted, since the MTC packet may be transmitted through the allocated resources after the message is exchanged between the terminal and the base station in four stages, a delay time is increased and resource efficiency is also reduced.

Also, in a new radio standard of the 3GPP 5G mobile communication standard, non-orthogonal multiple access (NOMA) methods in which a plurality of devices may overlap with each other for a predetermined resource aiming at capacity increase to support a large number of MTC devices have been considered. At this time, a separate uplink resource for the MTC traffic is separated and allocated to a random access channel (RACH) from the entire radio resources, and a plurality of MTC devices may access the resources through competition.

Generally, when the number of MTC devices competing in this process is increased, a transmission is failed due to a collision between MTC devices selecting and transmitting the same resource. That is, the MTC devices that may be simultaneously supported are limited by the capacity of the RACH channel.

In addition, the 5G mobile communication standard requires the support of an ultra-reliable low latency communication (uRLLC) terminal satisfying an ultra-low delay performance of 1 ms or less in a radio period. To this end, it is necessary to satisfy the ultra-reliable low latency requirements by superimposing and transmitting the traffic of an enhanced mobile broadband (eMBB) service already allocated in a downlink and an uplink through reservation without waiting up to the next transmission opportunity.

PRIOR ART DOCUMENT

Patent Document

Korean Patent Registration No. 10-1229690 [Title: Group-based MTC device control method and apparatus in mobile communication system]

SUMMARY OF THE INVENTION

An object of the present invention is to provide an apparatus for simultaneously multiplexing and transmitting a broadband traffic and a machine-to-machine traffic or an ultra-reliable low latency communication traffic using the same resource and a method thereof, in which intermittent data generated in a machine-type communication (MTC) terminal is transmitted with superimposition on a subcarrier allocated to an enhanced mobile broadband (eMBB) terminal without reservation by sharing a high-speed data transmission resource in an orthogonal frequency division modulation/multiplexing access (OFDMA) system.

Another object of the present invention is to provide an apparatus for simultaneously multiplexing and transmitting a broadband traffic and a machine-to-machine traffic or an ultra-reliable low latency communication traffic using the same resource and a method thereof, in which an MTC traffic is transmitted with superimposition on a resource to which another traffic is already transmitted without separate reservation when there is a traffic to be transmitted from the MTC terminal without separately dividing an RACH resource for the MTC terminal in an entire uplink wireless resource.

Yet another object of the present invention is to an apparatus for simultaneously multiplexing and transmitting a broadband traffic and a machine-to-machine traffic or an ultra-reliable low latency communication traffic using the same resource and a method thereof, in which an enhanced mobile broadband (eMBB) service for high-speed data transmission and an mMTC service for supporting a plurality of MTC terminals are simultaneously multiplexed and supported with a bandwidth of the same subcarrier in a 5G mobile communication standard.

According to an aspect of the present invention, there is provided an apparatus for simultaneously multiplexing and transmitting a broadband traffic and a machine-to-machine traffic using the same resource, the apparatus including: an enhanced mobile broadband (eMBB) terminal allocating an OFDMA resource; and a machine-type communication (MTC) terminal which shares a channel bandwidth having the same subcarrier as the eMBB terminal, is in a synchronized state with the eMBB terminal in all frame units, randomly selects one subcarrier from a plurality of subcarriers used in the eMBB terminal, and transmits an MTC traffic to be transmitted in synchronization with a frame of the selected subcarrier with superimposition on the same resource as an eMBB traffic.

As an embodiment related with the present invention, the MTC terminal may spread each symbol on a time axis with a spreading code having a length of M.

As an embodiment related with the present invention, the apparatus may further include a control device which detects the MTC traffic using a multiple measurement matrix based on a compressive sensing concept.

As an embodiment related with the present invention, the control device may calculate data for a j-th spreading symbol of the MTC terminal by applying an iterative order recursive least square (IORLS)-based estimation algorithm so as to detect $x_m^{(j)}$ corresponding to data of the MTC traffic with respect to the following Equation, $y^{(j)} = A_m x_m^{(j)} + z^{(j)}$, for j=1, 2 . . . , $N_C$, in which the $y^{(j)}$ represents a vector for each subcarrier, the $A_m$ represents a measurement matrix for transmission of the MTC terminal, and the $z^{(j)}$ represents a noise vector.

As an embodiment related with the present invention, the control device may calculate $y_h^{(j)}$ corresponding to data of the eMBB traffic as the following Equation by removing the calculated $\bar{x}_m^{(j)}$ from the OFDMA signal, $y_h^{(j)} = y^{(j)} - A_m \bar{x}_m^{(j)}$, for j=1, 2, . . . , $N_C$, in which the $y^{(j)}$ represents a vector for each subcarrier, the $A_m$ represents a measurement matrix for transmission of the MTC terminal.

According to another aspect of the present invention, there is provided an apparatus for simultaneously multiplexing and transmitting a broadband traffic and an ultra-reliable low latency communication traffic using the same resource, the apparatus including: an eMBB terminal allocating an OFDMA resource on a frequency axis; and an uRLLC terminal which shares a channel bandwidth having the same subcarrier as the eMBB terminal, is in a synchronized state with the eMBB terminal in all frame units, randomly selects one subcarrier from a plurality of subcarriers used in the eMBB terminal, and spreads and transmits an ultra-reliable low latency communication (uRLLC) traffic to be transmitted in synchronization with a frame of the selected subcarrier with superimposition from the plurality of subcarriers of the same symbol as an eMBB traffic.

According to yet another aspect of the present invention, there is provided an apparatus for simultaneously multiplexing and transmitting a broadband traffic and a machine-to-machine traffic or an ultra-reliable low latency communication traffic using the same resource, the apparatus including: an eMBB terminal allocating an OFDMA resource on a time axis and a frequency axis; an MTC terminal which shares a channel bandwidth having the same subcarrier as the eMBB terminal, is in a synchronized state with the eMBB terminal in all frame units, randomly selects one subcarrier from a plurality of subcarriers used in the eMBB terminal, and spreads and transmits an MTC traffic to be transmitted in synchronization with a frame of the selected subcarrier with superimposition on the same resource as an eMBB traffic; and an uRLLC terminal which shares a channel bandwidth having the same subcarrier as the eMBB terminal, is in a synchronized state with the eMBB terminal in all frame units, randomly selects the other subcarrier from a plurality of subcarriers used in the eMBB terminal, and spreads and transmits an uRLLC traffic to be transmitted in synchronization with a frame of the other selected subcarrier on a frequency axis with superimposition on the same resource as an eMBB traffic.

According to still another aspect of the present invention, there is provided a method for simultaneously multiplexing and transmitting a broadband traffic and a machine-to-machine traffic using the same resource, the method including: allocating, by an eMBB terminal, an OFDMA resource on a time axis; sharing, by an MTC terminal, a bandwidth having the same subcarrier as the eMBB terminal, being in a synchronized state with the eMBB terminal in all frame units, and randomly selecting one subcarrier from a plurality of subcarriers used in the eMBB terminal; and transmitting, by the MTC terminal, an MTC traffic to be transmitted in synchronization with a frame of the selected subcarrier with superimposition on the same resource as an eMBB traffic.

As an embodiment related with the present invention, in the transmitting of the MTC traffic with superimposition on the eMBB traffic, each symbol may be spread and transmitted on a time axis with a spreading code having a length of M.

According to still yet another aspect of the present invention, there is provided a method for simultaneously multiplexing and transmitting a broadband traffic and an ultra-reliable low latency communication traffic using the same resource, the method including: allocating, by an eMBB terminal, an OFDMA resource on a time axis; sharing, by an uRLLC terminal, a bandwidth having the same subcarrier as the eMBB terminal, being in a synchronized state with the eMBB terminal in all frame units, and selecting one symbol from OFDM symbols used in the eMBB terminal; and transmitting, by the uRLLC terminal, an uRLLC traffic to be transmitted in synchronization with a frame corresponding to the selected OFDM symbol with superimposition on the same resource as an eMBB traffic.

As an embodiment related with the present invention, in the transmitting of the uRLLC terminal with superimposition on the same resource as the eMBB traffic, each symbol may be spread and transmitted on a frequency axis through a plurality of subcarriers with a spreading code having a length of M.

According to the embodiment of the present invention, the intermittent data generated in the MTC terminal is transmitted with superimposition on the subcarrier allocated to the eMBB terminal without reservation by sharing the high-speed data transmission resource in the OFDMA system, thereby enhancing the efficiency of the resource by transmitting the data with superimposition while the eMBB traffic and the mMTC traffic share the same resource.

According to the embodiment of the present invention, the MTC traffic is transmitted with superimposition on the resource to be transmitted from the MTC terminal without separately dividing the RACH resource for the MTC terminal in the entire uplink radio resource and without separate reservation when there is a traffic to be transmitted from the MTC terminal, thereby reducing the latency time due to the data transmission by omitting the reservation process for the data transmission.

According to the embodiment of the present invention, in the 5G mobile communication standard, an eMBB service for high-speed data transmission and a mMTC service supporting a plurality of MTC terminals are simultaneously multiplexed and supported with a bandwidth of the same carrier bandwidth, thereby increasing the resource efficiency while maximizing the mMTC capacity.

According to the embodiment of the present invention, in the 5G mobile communication standard, an eMBB service for high-speed data transmission and an uRLLC service are simultaneously multiplexed and supported with a bandwidth of the same carrier bandwidth, thereby satisfying ultra-reliable latency performance required by the uRLLC service.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

It is noted that technical terms used in the present invention are used to just describe a specific embodiment and do not intend to limit the present invention. Further, unless the technical terms used in the present invention are particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that cannot accurately express the spirit of the present invention, the technical term is substituted by a technical term which can correctly appreciated by those skilled in the art to be appreciated. In addition, general terms used in the present invention should be analyzed as defined in a dictionary or according to front and back contexts and should not be analyzed as an excessively reduced meaning.

Moreover, if singular expression used in the present invention is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second' used in the present invention can be used to describe various components, but the components should not be limited by the terms. The terms are used only for distinguishing one component from the other component. For example, a first component may be named as a second component and similarly, the second component may also be named as the first component without departing from the scope of the present invention.

Hereinafter, preferred embodiments according to the present invention will be described in detail with reference to the accompanying drawings, and like or similar components are denoted by the same reference numerals regardless of a sign of the drawing, and duplicated description thereof will be omitted.

In describing the present invention, when it is determined that detailed description relating to well-known functions or configurations may make the subject matter of the present disclosure unnecessarily ambiguous, the detailed description will be omitted. Further, it is noted that the accompanying drawings are used just for easily appreciating the spirit of the present invention and it should not be analyzed that the spirit of the present invention is limited by the accompanying drawings.

Figure 1:
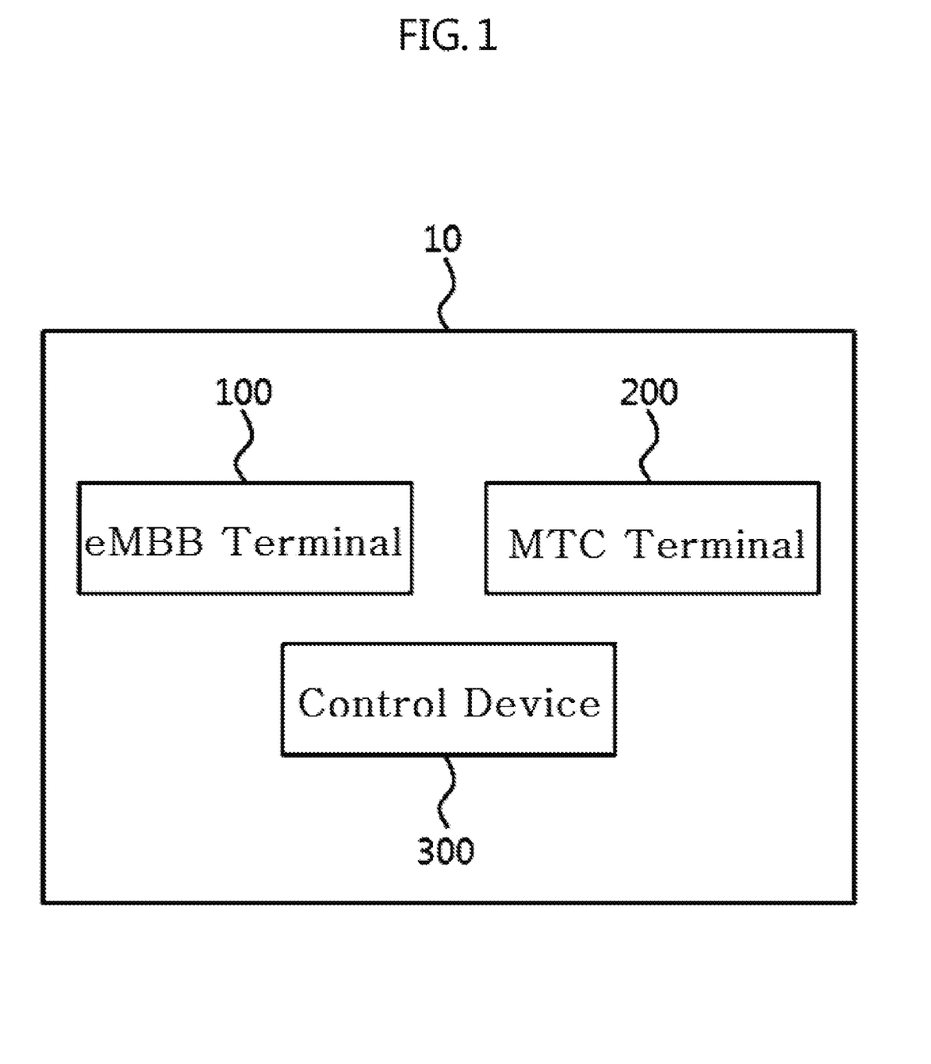
FIG. 1 is a block diagram illustrating a configuration of an apparatus for simultaneously multiplexing and transmitting a broadband traffic and a machine-to-machine traffic using the same resource according to an embodiment of the present invention.

FIG. 1 is a block diagram illustrating a configuration of an apparatus 10 for simultaneously multiplexing and transmitting a broadband traffic and a machine-to-machine traffic using the same resource according to an embodiment of the present invention.

As illustrated in FIG. 1, the apparatus 10 for simultaneously multiplexing and transmitting a broadband traffic and a machine-to-machine traffic using the same resource is configured by an eMBB terminal 100, an MTC terminal 200 and a control device 300. All of the components of the apparatus 10 for simultaneously multiplexing and transmitting the broadband traffic and the machine-to-machine traffic using the same resource illustrated in FIG. 1 are not required components, and the apparatus 10 for simultaneously multiplexing and transmitting the broadband traffic and the machine-to-machine traffic using the same resource may be implemented by more components than the components illustrated in FIG. 1 or implemented by less components than the components illustrated in FIG. 1.

The apparatus 10 for simultaneously multiplexing and transmitting the broadband traffic and the machine-to-machine traffic using the same resource may be an OFDMA system having $N_{SC}$ subcarriers. Here, the multiplexed traffic includes an eMBB traffic, an MTC traffic, a uRLLC traffic, and the like. At this time, the eMBB traffic occupies the entire bandwidth.

In addition, the apparatus 10 for simultaneously multiplexing and transmitting the broadband traffic and the machine-to-machine traffic using the same resource may divide frequency regions to have different subcarrier spacings.

In addition, in the apparatus 10 for simultaneously multiplexing and transmitting the broadband traffic and the machine-to-machine traffic using the same resource, as a channel bandwidth is increased, a symbol length is reduced while a subcarrier spacing is increased.

Also, in the case of the MTC traffic, a relatively narrow subcarrier spacing is applied in order to increase a coverage and minimize power consumption.

The enhanced mobile broadband terminal (eMBB) terminal 100 (hereinafter, referred to as the 'eMBB' terminal') is configured by the number of $K_h$.

Also, the eMBB terminal 100 shares a channel bandwidth having the same subcarrier as the MTC terminal 200.

Also, the eMBB terminal 100 may be in synchronization with the MTC terminal 200 in all frame units.

In addition, the eMBB terminal 100 allocates resources by dividing a given OFDMA resource for each eMBB terminal 100 with respect to a time axis and a frequency axis. At this time, the eMBB terminal 100 divides resources (or OFDMA resources) in a unit of $N_{RB}$ subcarriers.

The machine-type communication terminal (MTC) terminal 200 (hereinafter, referred to as the 'MTC' terminal') is configured by the number of $K_m$.

Also, the MTC terminal 200 shares a channel bandwidth having the same subcarrier as the eMBB terminal 100.

Also, the MTC terminal 200 may be in synchronization with the eMBB terminal 100 in all frame units.

Also, the MTC terminal 200 spreads each symbol on a time axis with a spreading code (or spreading sequence) having a length of M.

Further, the MTC terminal 200 randomly selects one subcarrier from a plurality of subcarriers.

That is, the MTC terminal 200 randomly selects one subcarrier from a plurality of subcarriers used in the eMBB terminal 100.

In addition, the MTC terminal 200 transmits the MTC traffic to be transmitted to the MTC terminal 200 with superimposition on the same resource as the eMBB traffic in synchronization with a frame of the selected subcarrier.

At this time, a unique spreading code is allocated for each subcarrier, and a spreading code used in an i-th subcarrier is represented by $s_i \in C^M$.

Accordingly, the apparatus 10 for simultaneously multiplexing and transmitting the broadband traffic and the machine-to-machine traffic using the same resource has $N_{SC}$ subcarriers. At this time, the apparatus may have a relation of $N_{SC} \gg M$.

In addition, the MTC terminal 200 transmits the MTC traffic related to the MTC terminal 200 with superimposition on the eMBB traffic related to the eMBB terminal 100 regardless of whether the resource is already allocated to the eMBB terminal 100. At this time, the eMBB terminal 100 and the MTC terminal 200 transmit data (or an OFDMA signal) in synchronization in a frame unit.

Figure 2:
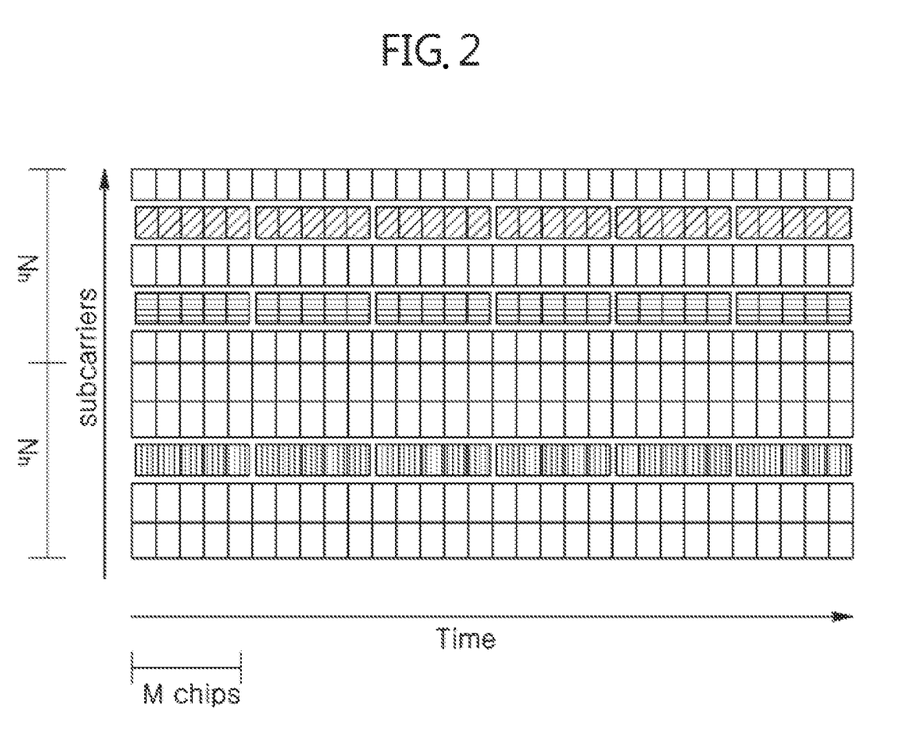
FIG. 2 is a diagram illustrating an allocation of an eMBB resource according to an embodiment of the present invention and a situation in which an MTC traffic spread by a spreading code of M=5 is transmitted through a subcarrier selected on the eMBB resource.

FIG. 2 is a diagram illustrating an allocation of an eMBB resource of $N_{RB}=5$ according to an embodiment of the present invention and a situation in which an MTC traffic spread by a spreading code of M=5 is transmitted through a subcarrier selected on the eMBB resource. At this time, as illustrated in FIG. 2, a situation in which three MTC terminals 200 (for example, indicated by a diagonal line, a horizontal diagonal line and a vertical diagonal line) transmit data is illustrated.

That is, as illustrated in FIG. 2, the eMBB traffic is transmitted as a resource configured by $N_h=5$ subcarriers, and the MTC traffic having a length of $N_C=6$ symbols is transmitted as one subcarrier resource. At this time, each MTC traffic symbol is spread by a spreading code having a length of M=5.

In addition, it is assumed that an activated MTC terminal 200 transmits $N_C$ symbols, and a deactivated MTC terminal 200 transmits a frame configured by all zeros. At this time, a column of symbols to be transmitted by the k-th MTC 200 is represented by $d_k \triangleq [d_k^{(1)}, d_k^{(1)}, d_k^{(3)}, \ldots, d_k^{(N_C)}]$. Here, $d_k^{(j)} \in A_0$ and $A_0 \equiv \{A=0\}$.

Also, the eMBB terminal 100 is allocated to $N_h$ subcarriers.

For example, as illustrated in FIG. 2, the eMBB terminal 100 is allocated to $N_h=5$ subcarriers.

Also, the transmission power of the MTC terminal 200 is reported through a downlink control signal.

Assuming that the eMBB terminal 100 and the MTC terminal 200 allocate power at a ratio of $\alpha$ and $(1-\alpha)$, respectively, the j-th symbol of the MTC terminal 200 received from the i-th subcarrier may be represented by a signal spread by a spreading code having a length of M=5 as illustrated in the following Equation 1.

$$y_i^{(j)} = \sum_{k \in K_i} \sqrt{1-\alpha} \cdot circ(h_k) s_i d_k^{(j)} + \sqrt{\alpha} \cdot \hat{x}_{h,i} + \omega_i \quad \text{[Equation 1]}$$

Here,
i=1, 2, 3, ..., $N_{SC}$ and j=1, 2, 3, ..., $N_C$.

Also, the $y_i^{(j)} \in C^M$, the $K_i$ represents a set of users selecting the i-th spreading code, the $s_i \in C^M$ represents the i-th spreading code, and the $d_k^{(j)}$ represents the j-th symbol of the k-th MTC terminal.

Further, the $h_k=[h_{k,1}, h_{k,2}, \ldots h_{k,l}, 0, 0, \ldots 0] \in C^M$ represents a multipath channel of the k-th user in an OFDM symbol sample unit, and here, $l_k$ represents the number of the multipath. At this time, the last zeros are inserted to prevent intersymbol interference of the MTC terminal 200.

In Equation 1, the $circ(h_k)$ represents a matrix expressed by the following Equation 2, which is configured by shifting sequentially $h_k$ as a column.

$$circ(h_k) = \begin{bmatrix} h_{k,1} & 0 & 0 & 0 & 0 & \ldots & 0 \\ h_{k,2} & h_{k,1} & 0 & 0 & 0 & \ldots & 0 \\ \vdots & h_{k,2} & h_{k,1} & 0 & 0 & \ldots & 0 \\ h_{k,l_k} & \vdots & h_{k,2} & \ddots & 0 & \ldots & 0 \\ 0 & h_{k,l_k} & \vdots & \vdots & h_{k,1} & \ldots & 0 \\ \vdots & \vdots & \vdots & \ddots & \vdots & \ddots & 0 \\ 0 & 0 & 0 & \ldots & h_{k,l_k} & \ldots & h_{k,1} \end{bmatrix} \quad \text{[Equation 2]}$$

In addition, in Equation 1 above, $\hat{x}_{h,i} \in C^M$ represents an eMBB signal over M OFDMs in an i-th subcarrier, and $\omega_i \in C^M$ and is a vector representing a noise sample to be added for each OFDM symbol in the i-th subcarrier In addition, with respect to the vector $y_i^{(j)}$ for each subcarrier in the Equation 1 above, the OFDM signal over all the subcarriers is represented by $$y^{(j)} = \sum_{i=1}^{N_{SC}} y_i^{(j)}$$

and $y^{(j)}$ may be represented by the following Equation 3.

$$y^{(j)} = A_m x_m^{(j)} + A_h \hat{x}_h^{(j)} + \omega_i \quad \text{[Equation 3]}$$

In Equation 3 above, $A_m \in C^{M \times N_C}$ is a measurement matrix for the transmission of the MTC terminal 200 and is determined by a channel and a spreading code.

That is, the $$A_m \in C^{M \times N_C} \text{ is}$$

$$\sqrt{i-\alpha}\sum_{k\in K_i} circ(h_k)s_i$$

in the i-th column of the measurement matrix if there is an MTC transmission in the i-th subcarrier and $\sqrt{1-\alpha}s_i$ in the i-th column of the measurement matrix if there is no MTC transmission in the i-th subcarrier.

In addition, the $x_m^{(j)}$ represents data transmitted from the subcarrier selected by the MTC terminal 200, and since the number of subcarriers selected for one MTC frame time is relatively too small because the MTC terminal 200 intermittently transmits the data, the $x_m^{(j)}$ may be referred to as a sparse vector. At this time, an i-th component of the $x_m^{(j)}$ may be $$\sum_{k\in K_i} d_k^{(j)}.$$

Also, in Equation 3 above, the $A_h \hat{x}_h^{(j)}$ represents an eMBB traffic component, which may be represented by one noise vector $z^{(j)} \in C^M$ together with the $\omega_i$.

Accordingly, Equation 3 above may be summarized as the following Equation 4 from the viewpoint of a reception signal of the MTC terminal 200.

$$y^{(j)}=A_m x_m^{(j)}+z^{(j)}, \text{ for } j=1,2,\ldots,N_C \quad \text{[Equation 4]}$$

Figure 3:
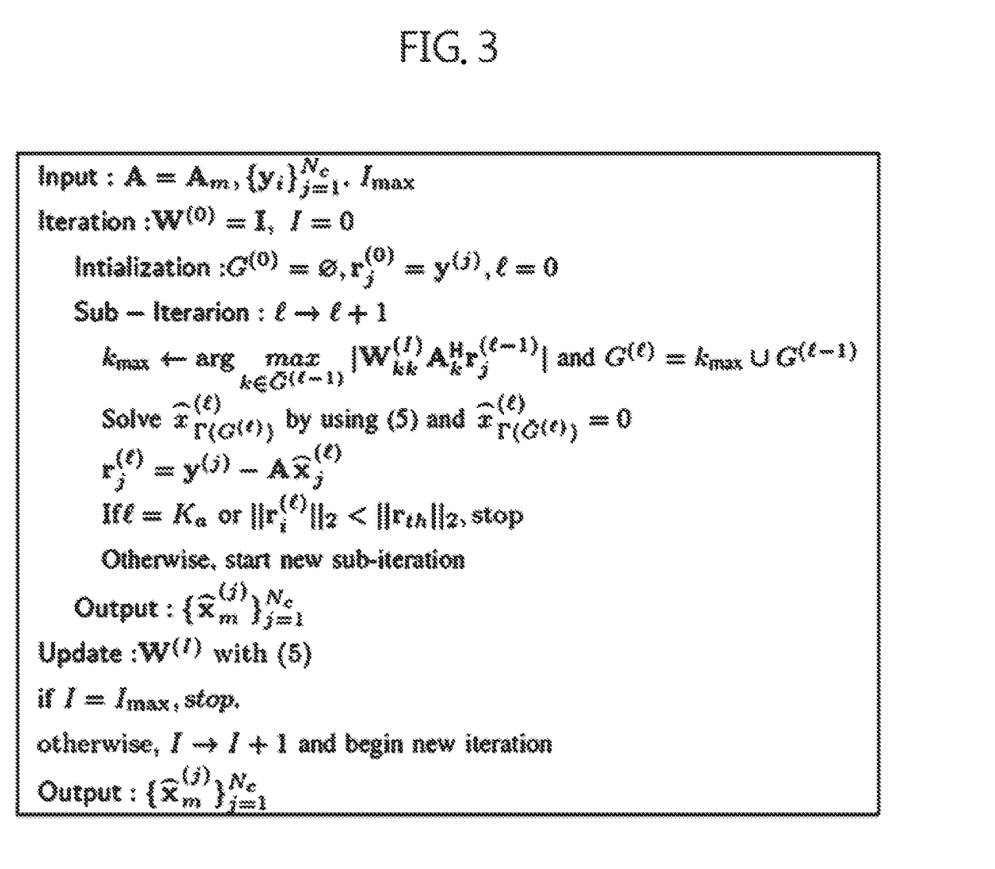
FIG. 3 is a diagram illustrating an iterative order recursive least square (IORLS)-based estimation algorithm according to an embodiment of the present invention.

When modeling is performed as illustrated in Equation 4, the control device 300 applies an algorithm (e.g., iterative order recursive least square (IORLS)-based estimation algorithm) illustrated in FIG. 3 to detect $x_m^{(j)}$ corresponding to data of the MTC traffic data.

Here, a k-th column of $A_m$ is represented by $a_m^{(k)}$ and the $r_j^{(l(k))}$ is a residual value (that is, $r_j^{(l(k))}=y^{(j)}-A\hat{x}^{(l(k)-1)}$) when the k-th column is selected and removed from an i-th internal loop, an equation for calculating a k-row and k-column value $W_{kk}^{(l)}$ of a weight matrix $W^{(l)}$ in the I-th loop of the IORLS algorithm may be represented as $$W_{kk}^{(l)}=\frac{\sum_{j=1}^{N_C}|W_{kk}^{(l-1)}a_m^{(k)}r_j^{(l(k))}|}{N_C}.$$

Further, in the IORLS algorithm, the following Equation 5 is given as follows as a solution of Equation 4 above.

$$\hat{x}_{\Gamma(G^{(l)})}^{(l)}=\begin{bmatrix}\hat{x}_{\Gamma(G^{(l-1)})}^{(l-1)}-\dfrac{D_l A_{l-1}^T A_k A_k^T P_{l-1}^\perp y}{A_k^T P_{l-1}^\perp A_k}\\[6pt]\dfrac{A_k^T P_{l-1}^\perp y}{A_k^T P_{l-1}^\perp A_k}\end{bmatrix} \quad \text{[Equation 5]}$$

Herein, when the $\Gamma(G^{(l)})$ is an operator for indexing components belonging to a set $G^{(l)}$, the $A_{\Gamma(G^{(l)})}$ represents a matrix configured by columns corresponding to an index determined by the $\Gamma(G^{(l)})$.

Further, in order to simplify the notation in Equation 5 above, $A_l = A_{\Gamma(G^{(l)})}$ is represented.

In Equation 5 above, $P_l^\perp = I - A_l D_l A_l^T$ and the $D_l$ may be calculated as the following Equation 6.

$$D_l=\begin{bmatrix}D_{l-1}+\dfrac{D_{l-1}A_{l-1}^T A_k A_k^T A_{l-1}D_{l-1}}{A_{k_{max}}^T P_{l-1}^\perp A_{k_{max}}} & -\dfrac{D_{l-1}A_{l-1}^T A_k}{A_k^T P_{l-1}^\perp A_k}\\[6pt] -\dfrac{D_{l-1}A_{l-1}^T A_{l-1}^T A_k}{A_k^T P_{l-1}^\perp A_k} & \dfrac{1}{A_k^T P_{l-1}^\perp A_k}\end{bmatrix} \quad \text{[Equation 6]}$$

When the data $\bar{x}_m^{(j)}$ for the j-th spreading symbol of the MTC terminal 200 is calculated, the control device 300 removes the calculated $\bar{x}_m^{(j)}$ from the received signal (or the OFDMA signal) to calculate the data (or the data of the eMBB traffic) of the eMBB terminal 100 as illustrated in the following Equation 7.

$$y_h^{(j)}=y^{(j)}-A_m\bar{x}_m^{(j)}, \text{ for } j=1,2,\ldots,N_C \quad \text{[Equation 7]}$$

As such, the MTC traffic may be detected based on a multiple measurement matrix using a compressive sensing concept.

Further, in a situation where the eMBB terminal 100 of a 3GPP new radio (NR) standard using various intersubcarrier spacings is already being transmitted, the MTC terminal 200 having a relatively narrow subcarrier spacing may select and transmit an arbitrary subcarrier.

As such, when the eMBB terminal 100 and the MTC terminal 200 coexist, a form occupying resources is exemplified as follows.

Figure 4:
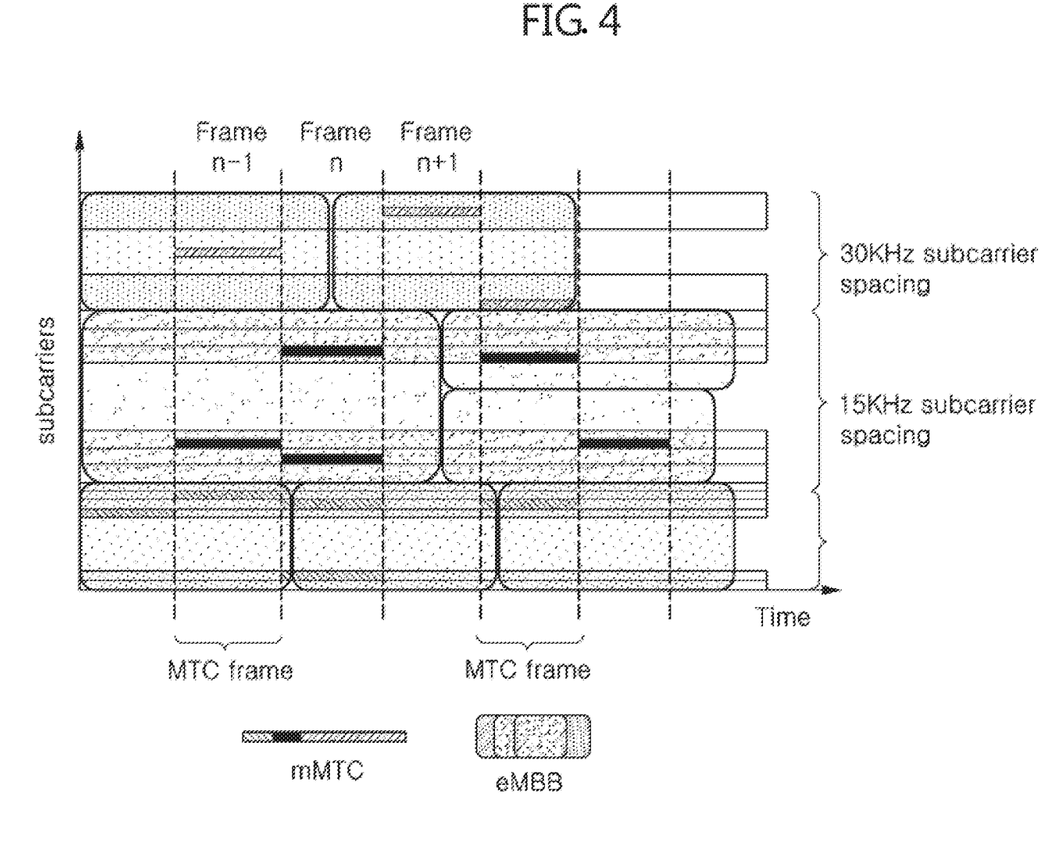
FIG. 4 is a diagram illustrating an example applied to a 3GPP new radio standard according to an embodiment of the present invention.

That is, as illustrated in FIG. 4, a frame of the MTC terminal 200 transmitted through one subcarrier is transmitted over a plurality of OFDM symbols (or OFDMA symbols) of the eMBB terminal 100.

Figure 5:
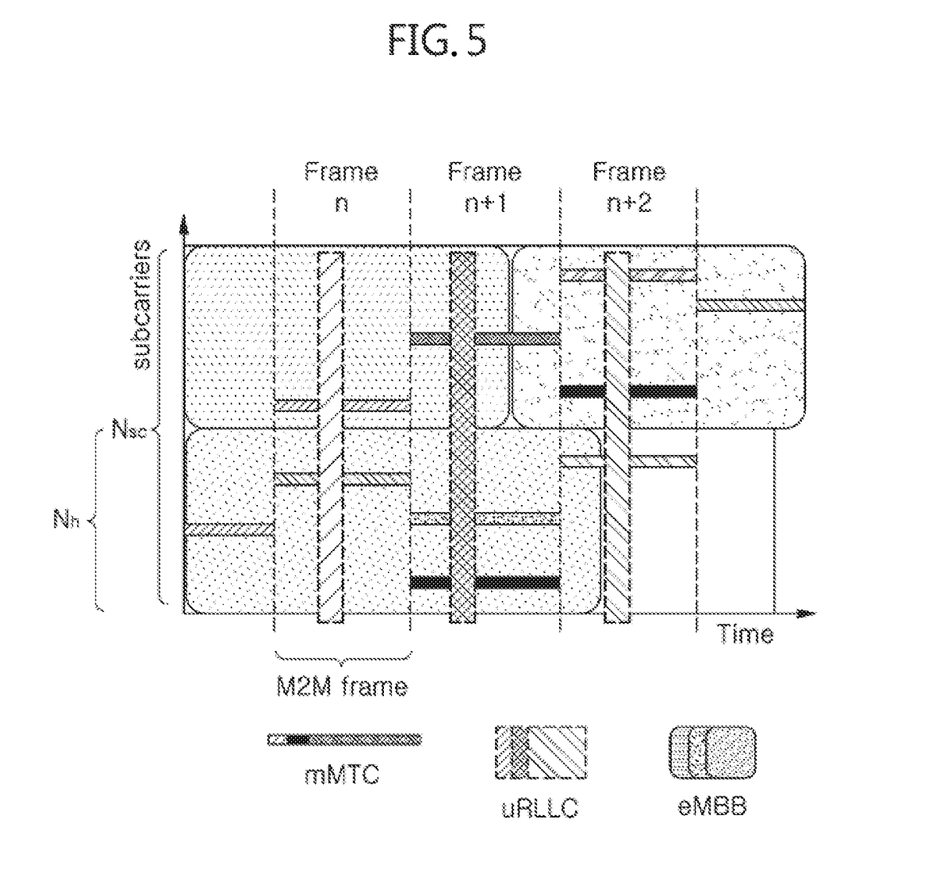
FIG. 5 is a diagram illustrating an example in which AN MTC traffic and a uRLLC traffic are transmitted on the eMBB traffic according to an embodiment of the present invention.

In the case of an ultra-reliable low latency communication (uRLLC) traffic which may not allow a long transmission latency time and requires fast transmission, as illustrated in FIG. 5, the uRLLC terminal (not illustrated) spreads over a plurality of subcarriers allocated to the eMBB traffic while widening a subcarrier spacing and shortening the length of the OFDM symbol. Also, the control device 300 may detect data of the uRLLC traffic and data of the eMBB traffic in the same manner as the method of detecting the data of the MTC traffic and the data of the eMBB traffic described above.

The uRLLC terminal spreads and transmits each symbol with a spreading code of a length M through a plurality of subcarriers on a frequency axis.

That is, the uRLLC terminal may be implemented by the same structure and procedure as the MTC terminal 200. At this time, the uRLLC terminal shares a channel bandwidth having the same subcarrier as the eMBB terminal 100, and the eMBB terminals 100 all may be in a synchronized state in a frame unit.

Also, the uRLLC terminal selects one symbol from a plurality of symbols used in the eMBB terminal 100 and transmits the uRLLC traffic to be transmitted in synchronization with superimposition on the subcarrier of the same symbol as the eMBB traffic to the frame of the subcarrier of the selected symbol.

As such, the uRLLC terminal spreads the uRLLC traffic over a plurality of subcarriers on a resource allocated to the eMBB traffic while shortening the length of the OFDM symbol by making the subcarrier spacing relatively wider than the subcarrier interval used in the MTC terminal 200.

Here, in FIG. 5, it is illustrated that both the uRLLC traffic spread over the subcarriers on the resource of the eMBB traffic and the MTC traffic spread on the time axis are transmitted, and even in the case, data of all traffics (e.g., an MTC traffic, an uRLLC traffic, an eMBB traffic, etc.) may be detected through the same detection concept. At this time, the uRLLC terminal transmits the uRLLC traffic by spreading the uRLLC traffic on the frequency axis for each symbol unit.

As such, the present invention may also be applied to the 3GPP NR standard.

The control device 300 (or a control unit/processor) executes the entire control function of the apparatus 10 for simultaneously multiplexing and transmitting the broadband traffic and the machine-to-machine traffic using the same resource.

The control device 300 executes the entire control function of the apparatus 10 for simultaneously multiplexing and transmitting the broadband traffic and the machine-to-machine traffic using the same resource by using programs and data stored in a storing unit (not illustrated). The control device 300 may include a RAM, a ROM, a CPU, a GPU, and a bus, and the RAM, the ROM, the CPU, and the GPU may be connected to each other via a bus. The CPU accesses the storing unit and may perform booting using an O/S stored in the storing unit and perform various operations using various programs, contents, and data stored in the storing unit.

In addition, the control device 300 analyzes the performance of the eMBB traffic and the MTC traffic by performing experiments using parameters illustrated in the following Table 1.

TABLE 1

| Parameter | Value | Parameter | Value |
| --- | --- | --- | --- |
| $N_{SC}$ | 1024 | $N_c$ | 80 |
| $N_h$ | 256:1024 | $k_m$ | 128 |
| M | 64 | Modulation | BPSK |
| $l_k$ | 6 | $\alpha$ | 0.1:0.5 |
| $I_{max}$ | 3 | SNR | 20 dB |

Figure 6:
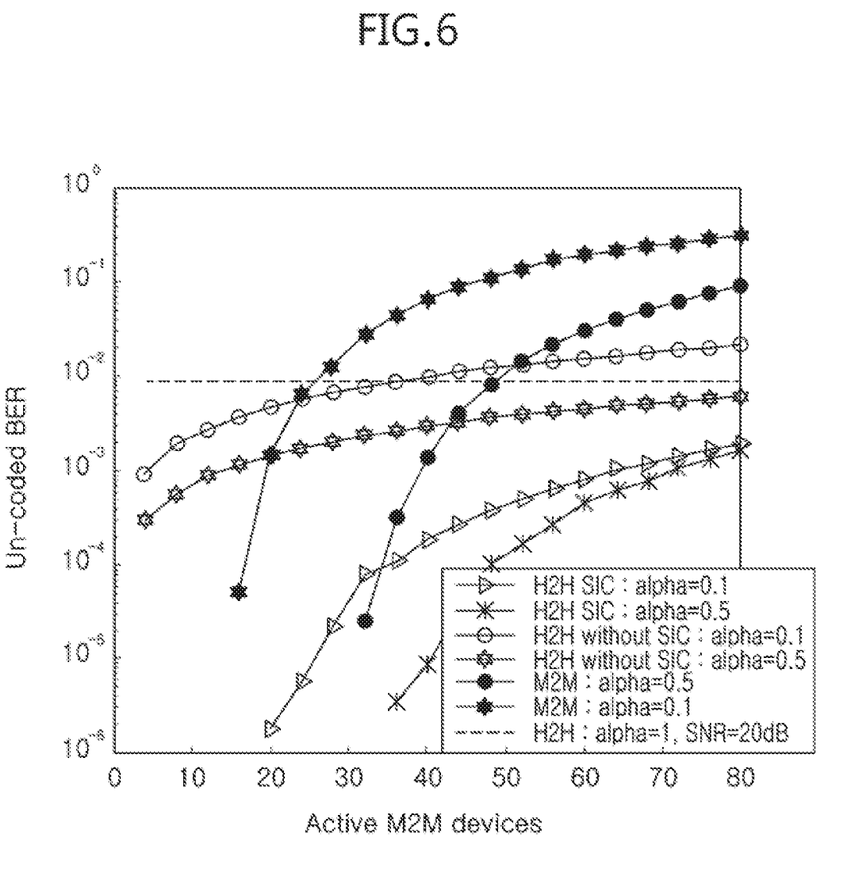
FIG. 6 is a diagram illustrating comparison of bit error performance according to the number of MTC terminals according to an embodiment of the present invention.

As illustrated in FIG. 6, the bit error performance of each terminal according to the number of simultaneously activated MTC terminals 200 is illustrated in FIG. 6.

The human-to-human (H2H) and machine-to-machine (M2M) illustrated in FIG. 6 represent the eMBB terminal 100 and the MTC terminal 200, respectively.

Also, the SIC represents a continuous interference cancellation procedure for detecting eMBB data.

In addition, it can be seen that performance of the eMBB terminal 100 and the MTC terminal 200 may be sufficiently secured by properly setting a power ratio $\alpha$ value.

Figure 7:
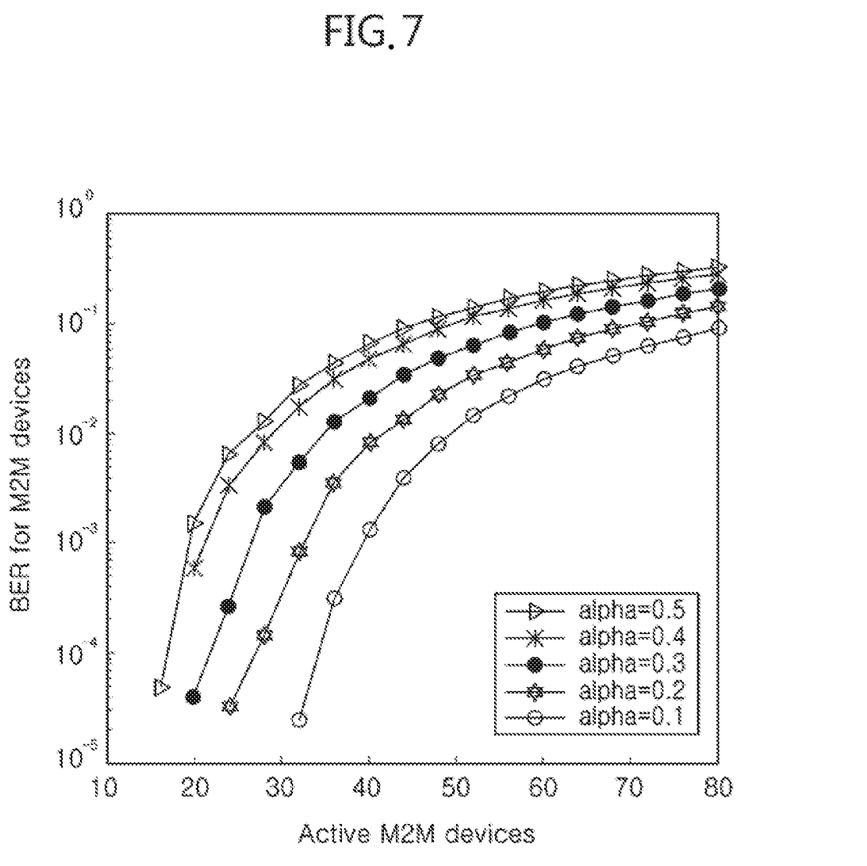
FIG. 7 is a diagram illustrating comparison of bit error performance of an MTC terminal according to a power ratio value according to an embodiment of the present invention.

As illustrated in FIG. 7, FIG. 7 illustrates bit error performance of the MTC terminal 200 according to a power ratio (or power allocation ratio) $\alpha$ value.

Also, in order to secure the performance of the MTC terminal 200, it can be seen that the power ratio $\alpha$ value needs to be appropriately set according to the number of MTC terminals to be simultaneously activated.

In the embodiment of the present invention, as described above, the intermittent data generated in the MTC terminal is transmitted with superimposition on the subcarrier allocated to the eMBB terminal without reservation by sharing the high-speed data transmission resource in the OFDMA system, thereby enhancing the efficiency of the resource by transmitting the data with superimposition while the eMBB traffic and the mMTC traffic share the same resource.

In the embodiment of the present invention, as described above, the MTC traffic is transmitted with superimposition on the resource to be transmitted from the MTC terminal without separately dividing the RACH resource for the MTC terminal in the entire uplink radio resource and without separate reservation when there is a traffic to be transmitted from the MTC terminal, thereby reducing the latency time due to the data transmission by omitting the reservation process for the data transmission.

In the embodiment of the present invention, as described above, in the 5G mobile communication standard, an eMBB service for high-speed data transmission and a mMTC service supporting a plurality of MTC terminals are simultaneously multiplexed and supported with a bandwidth of the same carrier bandwidth, thereby increasing the resource efficiency while maximizing the mMTC capacity.

In the embodiment of the present invention, as described above, in the 5G mobile communication standard, an eMBB service for high-speed data transmission and an uRLLC service are simultaneously multiplexed and supported with a bandwidth of the same carrier bandwidth, thereby satisfying ultra-reliable latency performance required by the uRLLC service.

The aforementioned contents can be corrected and modified by those skilled in the art without departing from the essential characteristics of the present invention. Accordingly, the various embodiments disclosed herein are not intended to limit the technical spirit but describe with the true scope and spirit being indicated by the following claims. The protection scope of the present invention should be construed based on the following appended claims and it should be appreciated that the technical spirit included within the scope equivalent to the claims belongs to the present invention.

According to the present invention, it is possible to enhance efficiency of resources, utilize such characteristics when establishing a 5G mobile communication standard, and be used widely as a structure and a procedure capable of ensuring the performance in a receiver of the terminal according to the standard, by transmitting intermittent data generated in an MTC terminal with superimposition on a subcarrier resource allocated to an eMBB terminal without reservation while sharing a high-speed data resource in an OFDMA system or transmitting an uRLCC traffic requiring a short transmission latency time with superimposition on a resource allocated to the eMBB terminal.

What is claimed is:

1. An apparatus for simultaneously multiplexing and transmitting a broadband traffic and a machine-to-machine traffic using the same resource, the apparatus comprising:
   an enhanced mobile broadband (eMBB) terminal allocating an OFDMA resource; and
   a machine-type communication (MTC) terminal which shares a channel bandwidth having the same subcarrier as the eMBB terminal, is in a synchronized state with the eMBB terminal in all frame units, randomly selects one subcarrier from a plurality of subcarriers used in the eMBB terminal, and transmits an MTC traffic to be transmitted in synchronization with a frame of the selected subcarrier with superimposition on the same resource as an eMBB traffic.

2. The apparatus of claim 1, wherein the MTC terminal spreads each symbol on a time axis with a spreading code having a length of M.

3. The apparatus of claim 1, further comprising:
   a control device which detects the MTC traffic using a multiple measurement matrix based on a compressive sensing concept.

4. The apparatus of claim 3, wherein the control device calculates data $\bar{x}_m^{(j)}$ for a j-th spreading symbol of the MTC terminal by applying an iterative order recursive least square (IORLS)-based estimation algorithm so as to detect $x_m^{(j)}$ corresponding to data of the MTC traffic with respect to the following Equation, $$y^{(j)}=A_m x_m^{(j)}+z^{(j)}, \text{ for } j=1,2,\ldots,N_C$$

wherein the $y^{(j)}$ represents a vector for each subcarrier, the $A_m$ represents a measurement matrix for transmission of the MTC terminal, and the $z^{(i)}$ represents a noise vector.

5. The apparatus of claim 4, wherein the control device calculates $y_h^{(j)}$ corresponding to data of the eMBB traffic as the following Equation by removing the calculated $\bar{x}_m^{(j)}$ from the OFDMA signal, $$y_h^{(j)}=y^{(j)}-A_m\bar{x}_m^{(j)}, \text{ for } j=1,2,\ldots,N_C$$

wherein the represents a vector for each subcarrier and the $A_m$ represents a measurement matrix for transmission of the MTC terminal.

6. An apparatus for simultaneously multiplexing and transmitting a broadband traffic and an ultra-reliable low latency communication traffic using the same resource, the apparatus comprising:
   an eMBB terminal allocating an OFDMA resource on a frequency axis; and
   an uRLLC terminal which shares a channel bandwidth having the same subcarrier as the eMBB terminal, is in a synchronized state with the eMBB terminal in all frame units, randomly selects one subcarrier from a plurality of subcarriers used in the eMBB terminal, and spreads and transmits an ultra-reliable low latency communication (uRLLC) traffic to be transmitted in synchronization with a frame of the selected subcarrier with superimposition from the plurality of subcarriers of the same symbol as an eMBB traffic.

7. An apparatus for simultaneously multiplexing and transmitting a broadband traffic and a machine-to-machine traffic or an ultra-reliable low latency communication traffic using the same resource, the apparatus comprising:
   an eMBB terminal allocating an OFDMA resource on a time axis and a frequency axis;
   an MTC terminal which shares a channel bandwidth having the same subcarrier as the eMBB terminal, is in a synchronized state with the eMBB terminal in all frame units, randomly selects one subcarrier from a plurality of subcarriers used in the eMBB terminal, and spreads and transmits an MTC traffic to be transmitted in synchronization with a frame of the selected subcarrier with superimposition on the same resource as an eMBB traffic; and
   an uRLLC terminal which shares a channel bandwidth having the same subcarrier as the eMBB terminal, is in a synchronized state with the eMBB terminal in all frame units, randomly selects the other subcarrier from a plurality of subcarriers used in the eMBB terminal, and spreads and transmits an uRLLC traffic to be transmitted in synchronization with a frame of the other selected subcarrier on a frequency axis with superimposition on the same resource as an eMBB traffic.

8. A method for simultaneously multiplexing and transmitting a broadband traffic and a machine-to-machine traffic using the same resource, the method comprising:
   allocating, by an eMBB terminal, an OFDMA resource on a time axis;
   sharing, by an MTC terminal, a bandwidth having the same subcarrier as the eMBB terminal, being in a synchronized state with the eMBB terminal in all frame units, and randomly selecting one subcarrier from a plurality of subcarriers used in the eMBB terminal; and
   transmitting, by the MTC terminal, an MTC traffic to be transmitted in synchronization with a frame of the selected subcarrier with superimposition on the same resource as an eMBB traffic.

9. The method of claim 8, wherein in the transmitting of the MTC traffic with superimposition on the eMBB traffic, each symbol is spread and transmitted on a time axis with a spreading code having a length of M.

10. A method for simultaneously multiplexing and transmitting a broadband traffic and an ultra-reliable low latency communication traffic using the same resource, the method comprising:
    allocating, by an eMBB terminal, an OFDMA resource on a time axis;
    sharing, by an uRLLC terminal, a bandwidth having the same subcarrier as the eMBB terminal, being in a synchronized state with the eMBB terminal in all frame units, and selecting one symbol from OFDM symbols used in the eMBB terminal; and
    transmitting, by the uRLLC terminal, an uRLLC traffic to be transmitted in synchronization with a frame corresponding to the selected OFDM symbol with superimposition on the same resource as an eMBB traffic.

11. The method of claim 10, wherein in the transmitting of the uRLLC terminal with superimposition on the same resource as the eMBB traffic, each symbol is spread and transmitted on a frequency axis through a plurality of subcarriers with a spreading code having a length of M.

* * * * *